United States Patent Office 2,932,210
Patented Apr. 12, 1960

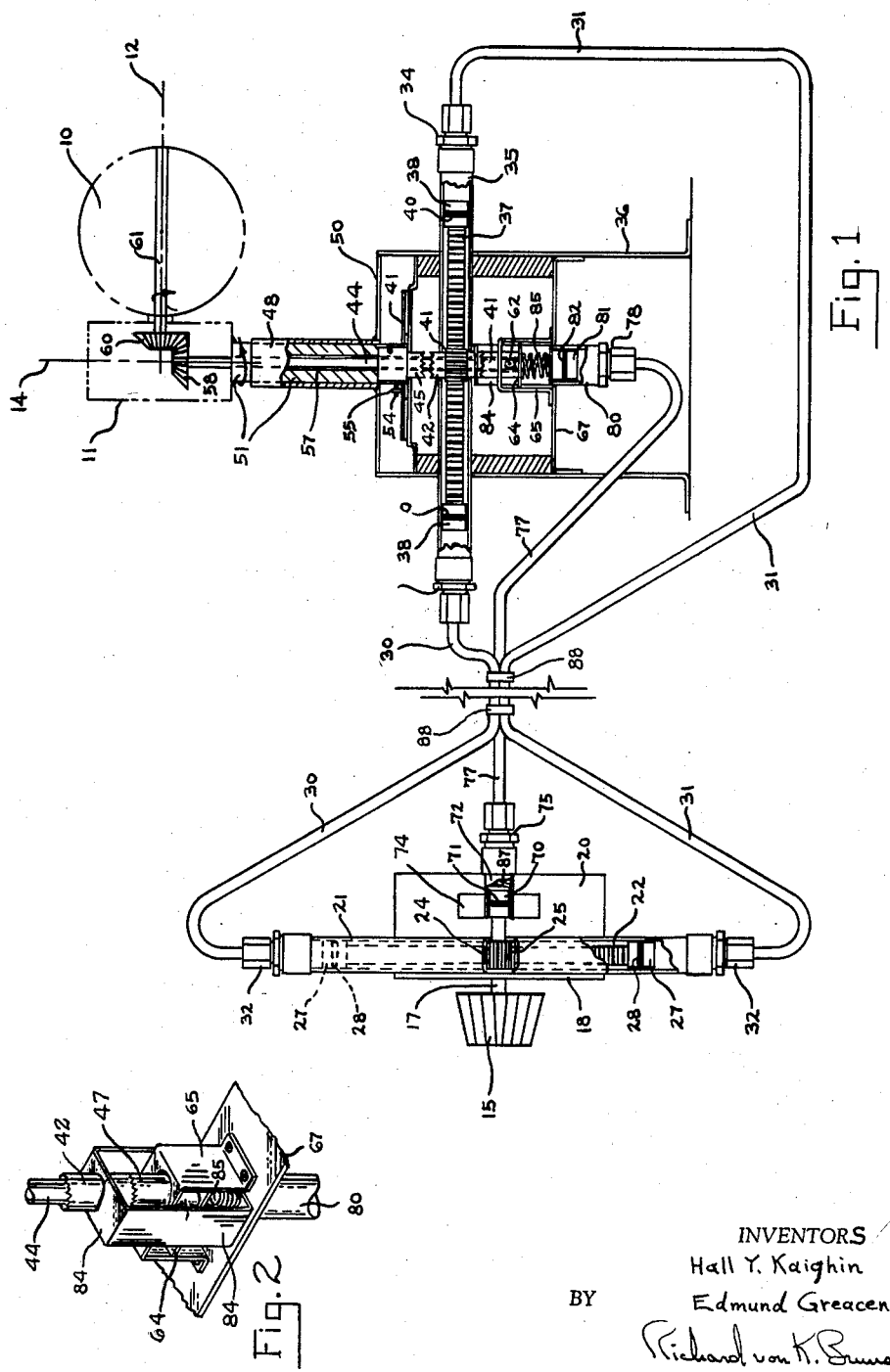

2,932,210

REMOTE CONTROL SYSTEM FOR ANGULAR POSITION ADJUSTMENT

Hall Y. Kaighin, New York, and Edmund Greacen, White Plains, N.Y., assignors to R. E. Dietz Company, Syracuse, N.Y., a corporation of New York Application April 24, 1957, Serial No. 654,769

9 Claims. (Cl. 74—471)

This invention relates generally to control systems, and has particular reference to an improved remote control system for adjusting the angular position of a pivotally mounted device such as a vehicle spotlight, rear view mirror, or the like.

Briefly stated, the invention contemplates a vehicle spotlight or similar device which is mounted at some point on the exterior of the vehicle for pivotal movement about both a horizontal and a vertical axis, or about any other pair of non-colinear axes, and it is a general object of the invention to provide an improved arrangement for permitting adjustment of the angular position of the device at a point located at some distance therefrom as, for example, in the cab of the vehicle within easy reach of the operator. Such an arrangement of course, is highly desirable for trucks of all kinds, taxicabs, busses and boats as well as ordinary passenger cars. Preferably, hydraulic means are employed in the control system to be disclosed because of the smoothness and ease of operation enabled thereby and also because of the dependability and durability thereof.

In addition to the general object stated above, another important object of the invention is to provide an improved control system for adjusting the angular position of a pivotally mounted device which is positive in action and positively holds the device in its adjusted position.

A further important object of the invention is to provide a control system of the above type wherein the angular adjustment of the device about either of its pivotal axes may be effected by a single control element located conveniently to the vehicle operator.

Still another important object of the invention is to provide a control system of the above type which is relatively simple in construction and can be economically manufactured and sold.

A still further important object of the invention is to provide a control system of the above type which is adapted for use on almost any type or model of vehicle, and is relatively simple to install in the vehicle.

A more specific object of the invention is to provide a control system of the above type having a novel rack arrangement wherein a single pair of hydraulically connected rack members, together with a hydraulically actuated clutch mechanism, is operable to effect pivotal movement of the device about either of its pivotal axes.

Other objects and advantages of the invention will become apparent from the following detailed description thereof read in conjunction with the accompanying drawings which illustrates a representative embodiment of the invention for the purpose of disclosure.

In the drawings:

Figure 1 is a schematic layout of a control system embodying the invention as adapted for use with a pivotally mounted vehicle spotlight; and Figure 2 is an enlarged top perspective view showing the details of the clutch mechanism.

Having reference now to the drawings, wherein like reference numbers designate the same parts in each of the views, 10 indicates a spotlight which is secured to a support or housing 11 for pivotal movement relative to the housing about a horizontal axis 12. The housing itself is mounted for pivotal movement about a vertical axis 14 so that the spotlight will also be movable about this axis with the housing, as will be described in more detail as the description proceeds.

In accordance with the invention, the angular adjustment of the spotlight 10 about either of the axes 12 or 14 is effected by a control knob 15 which is adapted to be located in the cab of the vehicle on the instrument panel, steering column, or any other convenient position within easy reach of the vehicle operator. Knob 15 is secured to the outer end of the shaft 17 journalled in the upstanding leg 18 of an angle bracket 20 which also supports an elongated hollow cylinder or tube 21. A rack 22 is mounted for reciprocable longitudinal movement within the cylinder, and the latter is cut away as at 24 where a pinion 25 fixed to the shaft 17 meshes with the rack. Rotation of the knob thus imparts longitudinal movement to the rack within the cylinder.

A piston 27 is secured to each end of the rack 22, and O-rings 28 on these pistons form a fluid tight seal between the pistons and cylinder 21. Outwardly of the pistons, the cylinder is connected at its ends to a pair of conduits 30, 31 as by fluid tight fittings 32. The conduits 30, 31 are respectively connected by fittings 34 to the ends of a second cylinder or tube 35 supported by a bracket 36 which is connected to the spotlight support in a manner to be explained. The cylinder 35 is preferably interchangeable with the cylinder 21 and also contains a longitudinally movable rack 37 provided at each end with a piston 38 and O-ring 40.

The conduits 30, 31 and portions of the cylinders outwardly of the pistons 27, 38 are filled with a fluid such as oil, and it will be apparent therefore that movement of the rack 22 by means of the control knob 15 will be transmitted by fluid pressure to the rack 37. Thus, when rack 22 is moved towards the left (or top of the sheet as shown in the drawings), rack 37 is moved to the right, and the fluid displaced by the right side of rack 37 flows through the conduit 31 and occupies the space on the right side of rack 22 which was created by its leftward movement. Similarly, movement of rack 22 in the right hand direction causes corresponding movement of rack 37 towards the left, and in either case the fluid action is positive due to the parallel or closed system of fluid paths.

While the major portion of the cylinder 35 is broken away in the drawings, this cylinder, like cylinder 21, is formed with a centrally disposed cut-away portion which permits a pinion 41 to mesh with the rack 37. Pinion 41 is fixed on a sleeve clutch 42 which is mounted with a free fit on a vertical shaft 44, the clutch having serrated ends as shown. Clutch 42 is slidable longitudinally on the shaft so that it can be moved into engagement either with the serrated end of a sleeve 45 mounted with a free fit on the shaft above the clutch or with a serrated end of a collar 47 fixed to the shaft below the clutch, one position permitting pivotal movement of the spotlight about the vertical axis and the other position permitting pivotal movement of the spotlight about the horizontal axis. In this connection, it will be observed that the pinion 41 is wider than the rack 37 so that the parts remain in mesh for either operating position of the clutch, and therefore any movement of the rack operates to rotate the clutch and whichever member 45 or 47 is in engagement therewith.

An upstanding sleeve 48 is secured to the top 50 of the bracket 36 as by welding, and a cylinder 51 which is fixed at its upper end to the spotlight support 11 extends downwardly through the sleeve and an aligned hole in the top 50 to a shelf 52 on the bracket where the lower edge of the cylinder rests. The lower end of cylinder 51 is bored to receive the upper end of the sleeve 45 which is secured thereto as by a set screw and passes with a free fit through a hole in the shelf 52 as shown. With this arrangement, when the clutch 42 is moved into engagement with the sleeve 45 and is rotated by movement of the rack 37, the cylinder 51 and spotlight housing 11 will also be rotated causing the spotlight to pivot about the vertical axis 14. To limit this angular movement to less than 360° in either direction, the sleeve 45 may be provided with a stop arm 54 engageable with an upstanding stop lug 55 on shelf 52.

The cylinder 51 on which the spotlight support 11 is mounted is formed with a longitudinal bore 57 therethrough, and the vertical shaft 44 on which the clutch is slidably mounted extends upwardly through this bore with a free fit so that it is rotatable relative to the cylinder. The upper end of shaft 44 terminates in a bevel gear 58 within the support 11, and this gear meshes with a bevel gear 60 on thte inner end of a horizontal shaft 61 which is fixedly secured to the spotlight but rotatable relative to the spotlight support. As previously mentioned, a collar 47 is secured to the lower end of the shaft 44 as by a set screw 62, and this collar rests upon a shelf 64 supported by an inverted U-shaped bracket 65 which is in turn mounted on a shelf 67 supported by the bracket 36. The collar 47 passes with a free fit through the top wall of the bracket 65 and is guided thereby for rotation relative to the bracket so that when the clutch 42 is in engagement with the collar and is rotated by the movement of the rack, this rotation is transmitted through the collar to the shaft 44 and gears 58, 60 to effect pivotal movement of the spotlight about the horizontal axis 12 independently of the support 11.

The shifting of the clutch 42 between its two operating positions is effected by the control knob 15 in the following manner. The knob and shaft 17 are movable longitudinally relative to the rack 22, and the inner end of the shaft terminates in a piston 70 having an O-ring 71 which makes a fluid tight seal with a cylinder 72 supported by clips 74 mounted on the bracket 20. The inner end of cylinder 72 is connected as by a fluid tight fitting 75 to one end of a conduit 77, the other end of which is connected as by a fitting 78 to a cylinder 80 depending from the shelf 67 on bracket 36. The upper end of cylinder 80 is open and communicates with an aligned hole in the shelf and a piston 81 having an O-ring 82 is positioned therein. Between the pistons 70 and 81, the cylinders 72, 80 and conduit 77 are filled with a fluid so that an inward movement of the piston 70 by means of the control knob will be transmitted by fluid pressure to effect an upward movement of piston 81.

The upper side of piston 81 bears against the lower end of a rectangular frame 84 which makes a loose linked connection with the bracket 65 and is connected at its upper end to the clutch 42 as is best shown in Figure 2. A compression spring 85 is interposed between the under side of the shelf 64 and upper side of the lower end of frame 84, and this spring normally holds the frame in abutment with the shelf 67 and the clutch in engagement with the collar 47. However, when the control knob 15 is pushed inwardly so that piston 81 is moved upwardly, the frame 84 is also moved against the action of the spring and shifts the clutch into engagement with the sleeve 45.

When the knob 15 is released, the spring 85 returns the frame 84 to its lower position so that the clutch is shifted back into engagement with the collar 47, and at the same time the frame pushes the piston 81 downwardly thereby forcing piston 70 and the control knob back into their outer positions, the latter action being aided by a compression spring 87 positioned within the cylinder 72 and bearing against piston 70. As in the case of the pinion 41, the length of pinion 24 is sufficiently greater than the width of the rack 22 so that it will remain in mesh therewith for either the inner or outer position of the control knob. Accordingly, it will be apparent that rotation of the control knob in its outer, normal position will cause the spotlight to pivot about the horizontal axis, while pushing in on the knob and rotating it will cause support 11 and spotlight to pivot as a unit about the vertical axis, the ultimate pivotal movement in both cases being effected through the racks and corresponding pinions in the same way. Moreover, the spotlight will be positively held in any angular position to which it is selectively moved due to the closed system of the fluid pressure actuating means and inherent frictional resistance between the racks and pinions.

Since the control knob 15, bracket 20 and associated parts are adapted to be located near the operator of the vehicle and the spotlight 10, bracket 36 and its associated parts are adapted to be located at a point some distance away such as on the front fender or top of the vehicle, conduits 30, 31 and 77 may necessarily be quite long and are preferably banded together intermediate the two locations as by straps 88. The connecting portions of the control system will thus occupy a relatively small area so that installation thereof in the vehicle will be a relatively simple task. While the invention has been particularly described with respect to a vehicle mounted mounted spotlight or similar device, it will be apparent that the motion transmitting arrangement disclosed herein need not be confined to such use since other applications for the arrangement will be readily apparent to those skilled in the art.

From the foregoing description, it will be apparent that the present invention provides a greatly improved arrangement for permitting adjustment of the angular position of a pivotally mounted device at a point remote therefrom, the arrangement disclosed being positive and reliable in action and of a relatively simple construction. It will be understood, however, that the invention may be embodied in other specific forms without departing from the spirit or essential characteristics thereof, and the embodiment disclosed is therefore to be considered in all respects as illustrative and not restrictive, the scope of the invention being indicated by the appended claims.

What is claimed is:

1. Control means for adjusting the angular position of a device mounted for pivotal movement about each of two intersecting axes comprising a first and a second rack member disposed in spaced relation to one another, means independently supporting each of said rack members for reciprocable longitudinal movement, a pinion in mesh with said first rack member, a control element operably connected to said pinion to effect movement of said first rack member therethrough, means operably connecting corresponding ends of said first and second rack members to transmit the movement of said first member to said second member, a second pinion in mesh with said second rack member, a two-position clutch operably connected to said second pinion, said clutch and second pinion being rotated upon movement of said second rack member, a first means operably connected to said device and engaged by said clutch in one of its positions effect pivotal movement of the device about one of said axes, a second means operably connected to said device and engaged by said clutch in its other position effect pivotal movement of the device about the other of said axes, and means operably connecting said control element and clutch to shift the latter from one position to the other.

2. Control means for adjusting the angular position of a device mounted for pivotal movement about each of two intersecting axes comprising a first and a second rack member disposed in spaced relation to one another, means independently supporting each of said rack members for reciprocable longitudinal movement, a rotatable control element having a shaft disposed at substantially right angles to said first rack member, said element and shaft being mounted for longitudinal movement relative to the member between alternate limiting positions, a pinion mounted on said shaft for rotation therewith, said pinion being in mesh with said first rack member in either alternate position of said control element whereby rotation of the element in either position effects longitudinal movement of the rack member, means operably connecting corresponding ends of said first and second rack members to transmit the movement of the first member to the second member, a rotatable clutch shiftable longitudinally between two operating positions, a pinion mounted on said clutch for rotation therewith, said pinion being in mesh with said second rack member in either operating position of said clutch whereby longitudinal movement of the member effects rotation of the pinion and clutch, a first means operably connected to said device and engaged by said clutch in one of its operating positions to effect pivotal movement of the device about one of said axes, a second means operably connected to said device and engaged by said clutch in its other operating position to effect pivotal movement of the device about the other of said axes, and means operably connecting said control element shaft to said clutch so that movement of the control element between its alternate positions effects a shifting of the clutch from one of its operating positions to the other operating position.

3. Control means for adjusting the angular position of a device mounted for pivotal movement about each of two intersecting axes comprising a first and a second rack member disposed in spaced relation to one another, means independently supporting each of said rack members for reciprocable longitudinal movement, manually operable means to effect reciprocable longitudinal movement of said first rack member, hydraulic means operably connecting corresponding ends of said first and second rack members together for transmitting the movement of the first member to the second member, a two-position clutch operably connected to said device, means to rotate said clutch in either of its two positions upon longitudinal movement of said second rack member, a support for said device including a first means engaged by said clutch in one of its positions to effect pivotal movement of the device about one of said axes and a second means engaged by the clutch in its other position to effect pivotal movement of the device about the other of said axes, and hydraulic means operably connecting said manually operable means to said clutch to shift the clutch from one position to the other.

4. In a hydraulic system for adjusting the angular position of a spotlight mounted for pivotal movement about each of two intersecting axes: a first and a second rack member; means independently supporting each of said rack members for reciprocable longitudinal movement; manually operable means to effect longitudinal movement of said first rack member; fluid pressure means operably connecting corresponding ends of said first and second rack members together for transmitting the movement of the first member to the second member, said fluid pressure means including a piston mounted on each end of said rack members, a cylinder coacting with each piston, and a conduit connecting the cylinders between corresponding ends of the racks; a two-position clutch operably connected to said spotlight; means to rotate said clutch in either of its two positions upon longitudinal movement of said second rack member, a support for said spotlight including a first means engaged by said clutch in one of its positions to effect pivotal movement of the spotlight about one of said axes and a second means engaged by the clutch in its other position to effect pivotal movement of the spotlight about the other of said axes, and fluid pressure means connecting said manually operable means to said clutch to shift the clutch from one position to the other, said last-named means including a piston operably connected to each of said manually operable means and clutch, a cylinder coacting with each piston, and a conduit connecting said cylinders.

5. In a hydraulic system for adjusting the angular position of a spotlight mounted for pivotal movement about each of two mutually perpendicular axes: a first and a second rack member; means supporting each of said rack members for reciprocable longitudinal movement; a pinion in mesh with said first rack member; a control element operably connected to said pinion to effect longitudinal movement of said first rack member therethrough; fluid pressure means operably connecting corresponding ends of said first and second rack members together for transmitting the movement of the first member to the second member, said fluid pressure means including a piston mounted on each end of said rack members, a cylinder enclosing each piston, and a conduit connecting the cylinders between corresponding ends of the racks; a second pinion in mesh with said second rack member; a two-position clutch operably connected to said second pinion and said spotlight, said clutch and second pinion being rotated upon longitudinal movement of said second rack member, a support for said spotlight including a first means engaged by said clutch in one of its positions to effect pivotal movement of said spotlight about one of said axes and a second means engaged by the clutch in its other position to effect pivotal movement of the spotlight about the other of said axes; and fluid pressure means connecting said control element to said clutch to shift the latter from one position to the other, said last-named means including pistons operably connected to said control element and clutch, a cylinder enclosing each piston, and a conduit connecting said cylinders together.

6. Structure as defined in claim 5 wherein said clutch is a longitudinally movable sleeve, and said second pinion is mounted on the sleeve in encircling relation thereto.

7. Structure as defined in claim 5 including a rotatably mounted support member for said spotlight, said spotlight being pivotally secured to said support member, rotation of said clutch in one of its positions effecting pivotal movement of said spotlight about a horizontal axis independently of said support member, and rotation of said clutch in the other of its positions effecting pivotal movement of said support member and spotlight as a unit about a vertical axis.

8. In a hydraulic system for adjusting the angular position of a spotlight mounted for pivotal movement about both a horizontal and a vertical axis: a first and a second rack member; means supporting each of said rack members for reciprocable longitudinal movement; a rotatable control element having a shaft disposed at substantially right angles to said first rack member, said element and shaft being mounted for longitudinal movement relative to the member between alternate limiting positions; a pinion mounted on said shaft for rotation therewith, said pinion being in mesh with said first rack member in either alternate position of said control element whereby rotation of the element in either position effects longitudinal movement of the rack member; fluid pressure means operably connecting corresponding ends of said first and second rack members together for transmitting the movement of the first member to the second member, said fluid pressure means including a piston mounted on each end of said rack members, a cylinder enclosing each piston, and a conduit connecting the cylinders between corresponding ends of the racks; a rotatable clutch operably connected to said spotlight and shiftable longitudinally between two operating positions; a pinion mounted on said clutch for rotation therewith, said pinion being in mesh with said second rack member in either operating position of the clutch whereby longitudinal movement of the member effects rotation of the pinion and clutch, a support for said spotlight including a first means engaged by said clutch in one of its positions to effect pivotal movement of said spotlight about the horizontal axis and a second means engaged by the clutch in its other operating position to effect pivotal movement of the spotlight about the vertical axis; and fluid pressure means operably connecting said control element shaft to said clutch so that movement of the control element between its alternate positions effects a shifting of the clutch from one of its operating positions to its other operating position, said last-named means including a piston connected to said shaft, a piston operably connected to said clutch, a cylinder enclosing each piston, and a conduit connecting said cylinders together.

9. Control means for adjusting the angular position of a spotlight mounted for pivotal movement about both a horizontal and a vertical axis comprising a first and a second rack member disposed in spaced relation to one another, manually operable means to effect reciprocable longitudinal movement of said first rack member, hydraulic means operably connecting corresponding ends of said first and second rack members together for transmitting the movement of the first member to the second member, a support for said spotlight mounted for pivotal movement about a vertical axis, said spotlight being secured to said support for pivotal movement about a horizontal axis, means to actuate the pivotal movement of said spotlight independently of said support, a rotatable clutch shiftable longitudinally between a position in operable engagement with said support and a position in operable engagement with said independent spotlight actuating means, means to rotate said clutch in either position upon movement of said second rack member, rotation of said clutch when in engagement with said support effecting pivotal movement of the support and spotlight as a unit about the vertical axis and rotation of the clutch when in engagement with said actuating means effecting pivotal movement of the spotlight about the horizontal axis independently of the support, and hydraulic means operably connecting said manually operable means to said sleeve clutch to shift the clutch from one position to the other.

References Cited in the file of this patent

UNITED STATES PATENTS

| | | |
|---|---|---|
| 1,012,954 | Williams | Dec. 26, 1911 |
| 1,271,565 | Gossard et al. | July 9, 1918 |
| 1,285,814 | Silsbee | Nov. 26, 1918 |
| 1,398,291 | Arbuckle | Nov. 29, 1921 |
| 1,400,259 | Black | Dec. 13, 1921 |
| 1,772,918 | Sklarek | Aug. 12, 1930 |
| 2,632,097 | Cone | Mar. 17, 1953 |

FOREIGN PATENTS

| | | |
|---|---|---|
| 927,796 | France | May 12, 1947 |